United States Patent
Li et al.

(10) Patent No.: US 12,043,792 B1
(45) Date of Patent: Jul. 23, 2024

(54) CARBON DIOXIDE CAPTURING POLYMERIC SYSTEM FOR WATER SHUTOFF APPLICATIONS

(71) Applicant: ARAMCO SERVICES COMPANY, Houston, TX (US)

(72) Inventors: Wenwen Li, Pearland, TX (US); Fakuen Frank Chang, Houston, TX (US); Feng Liang, Cypress, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/160,541

(22) Filed: Jan. 27, 2023

(51) Int. Cl.
  *C09K 8/44* (2006.01)
  *B01J 20/18* (2006.01)
  *B01J 20/22* (2006.01)
  *E21B 33/138* (2006.01)

(52) U.S. Cl.
  CPC ............... *C09K 8/44* (2013.01); *B01J 20/18* (2013.01); *B01J 20/22* (2013.01); *E21B 33/138* (2013.01)

(58) Field of Classification Search
  None
  See application file for complete search history.

(56) References Cited

U.S. PATENT DOCUMENTS

| | | | |
|---|---|---|---|
| 8,377,173 B2 | 2/2013 | Chuang | |
| 9,457,340 B2 | 10/2016 | Buelow et al. | |
| 2008/0085844 A1 | 4/2008 | Treybig et al. | |
| 2012/0076711 A1 | 3/2012 | Gebald et al. | |
| 2014/0190697 A1* | 7/2014 | Tang | C09K 8/68 166/295 |
| 2018/0002595 A1* | 1/2018 | Neil | E21B 43/25 |
| 2018/0298271 A1* | 10/2018 | Auzerais | C09K 8/703 |
| 2020/0157415 A1* | 5/2020 | Quintero | E21B 43/267 |
| 2020/0206719 A1 | 7/2020 | Choi et al. | |
| 2021/0197172 A1 | 7/2021 | Goeppert et al. | |

FOREIGN PATENT DOCUMENTS

| | | |
|---|---|---|
| CN | 114522669 A | 5/2022 |
| KR | 101487543 B1 | 1/2015 |
| KR | 101502109 B1 | 4/2015 |
| KR | 101707819 B1 | 2/2017 |
| KR | 101930740 B1 | 12/2018 |
| KR | 20210097609 A | 8/2021 |
| WO | 2013000953 A2 | 1/2013 |
| WO | 2017078219 A1 | 5/2017 |

OTHER PUBLICATIONS

An, Xuefei, et al., "Balancing the CO2 adsorption properties and the regeneration energy consumption via the functional molecular engineering hierarchical pore-interface structure", Chemical Engineering Journal, ScienceDirect, Elsevier B.V., vol. 431, No. 133877, 2022 (10 pages).
Dutcher, Bryce, et al., "Amine-Based CO2 Capture Technology Development from the Beginning of 2013—A Review", Applied Materials & Interfaces, ACS Publications, American Chemical Society, vol. 7, 2015, pp. 2137-2148 (12 pages).
Fatimah, Arshia, et al., "Polymer Nanocomposites for Water Shutoff Application—A Review", Materials Research Express, 2018 (42 pages).
Kang, Wanli, et al., "Progress of polymer gels for conformance control in oilfield", Advances in Colloid and Interface Science, ScienceDirect, Elsevier B.V., vol. 289, No. 102363, 2021 (16 pages).
Rahman, Siti Aisha Ab, et at., "The chemistry insight: epoxy sealant as an alternative remedial operation for well integrity", Reviews in Chemical Engineering, De Gruyter, 2022, pp. 1-17 (17 pages).
Taha, Abdullah and Mahmood Amani, "Overview of Water Shutoff Operations in Oil and Gas Wells; Chemical and Mechanical Solutions", ChemEngineering, MDPI, vol. 3, No. 51, May 2019, pp. 1-11 (11 pages).
Ünveren, Elif Erdal, et al., "Solid Amine Sorbents for CO2 Capture by Chemical Adsorption: A Review", Petroleum, 2017 (39 pages).
Yang, Chuanruo, et al., "Amine-functionalized micron-porous polymer foams with high CO2 adsorption efficiency and exceptional stability in PSA process", Chemical Engineering Journal, ScienceDirect, Elsevier B.V., vol. 420, No. 129555, 2021 (10 pages).
Zhou, Lingyun, et al., "Highly efficient and reversible CO2 adsorption by amine-grafted platelet SBA-15 with expanded pore diameters and short mesochannels", Green Chemistry, Royal Society of Chemistry, vol. 16, 2014, pp. 4008-4016 (8 pages).
Zhu, Daoyi, et al., "Comprehensive Review of Sealant Materials for Leakage Remediation Technology in Geological CO2 Capture and Storage Process", Energy & Fuels, ACS Publications, American Chemical Society, vol. 35, 2021, pp. 4711-4742 (32 pages).

* cited by examiner

*Primary Examiner* — Andrew Sue-Ako
(74) *Attorney, Agent, or Firm* — Osha Bergman Watanabe & Burton LLP

(57) ABSTRACT

A treatment fluid and method for water shut-off applications containing an amine-functionalized solid support, an epoxy resin, a second curing agent, and a carrier fluid. Prior to use of the treatment fluid, the amine-functionalized solid support has reacted with carbon dioxide to produce a carbamate-functionalized solid support. The treatment fluid is introduced into a geological formation with high-permeability pathways, curing the epoxy resin, and sealing these pathways.

10 Claims, No Drawings

CARBON DIOXIDE CAPTURING POLYMERIC SYSTEM FOR WATER SHUTOFF APPLICATIONS

BACKGROUND

As the number of maturing reservoirs grows, the need to manage water production is becoming even more pressing. Produced water is defined as water that is brought to the surface together with the produced hydrocarbon. The produced water is by far the largest volume waste stream associated with oil and gas production; in many parts of the world, water production can be as much as 98% of the material brought to the surface, especially near the end of the productive life of the well. The produced water needs to be treated before discharge or reinjection to meet the regulation requirements and prevent environmental pollution. In addition, high water production can detrimentally affect the economic life of hydrocarbon producing wells and can cause many other oilfield-related problems, such as scale deposition, fines migration, corrosion, and potential formation collapse. The water production can occur as a result of a variety of mechanisms, such as water coning, water cresting, and bottom water channeling at the wellbore. The water production can also result from a water-producing zone communicating with the oil- or gas-producing zone through fractures, high-permeability streaks, or fissures. A thief zone, also called a super K permeability zone, which generally refers to channel with high absolute permeability, can cause serious water breakthrough problems. Thus, how to efficiently control or reduce excess water production is a key issue faced by the oil and gas industry.

Further, there is a need for carbon dioxide-capturing systems for the purpose of reducing carbon dioxide emissions. Carbon dioxide captured from a large point source must be sequestered if carbon dioxide emissions are to be reduced. Accordingly, there exists a need for methods for permanent storage of carbon dioxide.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a treatment fluid containing an amine-functionalized solid support, an epoxy resin, a second curing agent, and a carrier fluid. The amine-functionalized solid support has reacted previously with carbon dioxide to produce a carbamate-functionalized solid support. The epoxy resin is selected from the group consisting of bis-phenol A epoxy, bis-phenol F epoxy, aliphatic epoxy, and cycloaliphatic epoxy. The second curing agent is selected from the group consisting of dicyandiamide and a dihydrazide. A carrier fluid is selected from the group consisting of water, -glycol ether, ethylene glycol, dimethyl sulfoxide, dimethyl formamide, and petroleum distillate fractions.

In another aspect, embodiments disclosed herein relate to a method. The method includes combining a carbamate-functionalized solid support, an epoxy resin, a second curing agent, and a carrier fluid to create a treatment fluid. This treatment fluid is introduced into a geological formation with high-permeability pathways. Once the treatment fluid is introduced, the epoxy resin cures and seals the high-permeability pathways. The epoxy resin is selected from the group consisting of bis-phenol A epoxy, bis-phenol F epoxy, aliphatic epoxy, and cycloaliphatic epoxy. The second curing agent is selected from the group consisting of dicyandiamide and a dihydrazide. A carrier fluid is selected from the group consisting of water, -glycol ether, ethylene glycol, dimethyl sulfoxide, dimethyl formamide, and petroleum distillate fractions.

Other aspects and advantages of the claimed subject matter will be apparent from the following description and the appended claims.

DETAILED DESCRIPTION

Excess water production is a problem that may occur in oil and gas wells. Water production may increase corrosion and degradation in the production facilities and may increase operating cost by increasing the weight of the fluid column. The water must also be separated, treated, and disposed of Unwanted water production may stem from high permeability layers due to water-flooding operations or water formations such as aquifers. Water shut-off operations are thus important to reduce the amount of water production. Water shut-off refers to blocking high-permeability pathways and closing openings through which water can travel into the wellbore, reducing the amount of water produced.

A carbon dioxide-capturing polymeric system may be used for water shut-off operations and also conformance control. Conformance control means to control water production, thereby achieving the preferred conforming conditions to produce more oil and gas. An epoxy-based system may be used to capture carbon dioxide from large point sources before transporting and storing the carbon dioxide in an oil and gas well. An amine-functionalized solid support may be used. Carbon dioxide is absorbed through reaction between the —$NH_2$ groups and carbon dioxide to form carbamate and trap the carbon dioxide in the solid support, producing carbamate-functionalized solid support. The carbamate-functionalized solid support can serve as a delayed amine-containing crosslinker that is capable of being set on-demand under downhole conditions. The solid material with the captured carbon dioxide is then mixed with epoxy resin, a carrier fluid, and other additives, which may include one or more additional curing agents. The resulting treatment fluid is introduced into the target zone of a hydrocarbon reservoir in a geological formation as a water shutoff treatment fluid. Thermal decomposition causes the amine groups to regenerate. The regenerated amine groups on the amine-functionalized solid support, prevented from reacting prior to regeneration by the formation of carbamate groups, may serve as a delayed curing agent for the epoxy resin, leading to the formation of a crosslinked polymer network after the epoxy has cured. The epoxy resin subsequently cures, forming a crosslinked polymer, plugging the high permeability channels, and trapping the carbon dioxide in the geological formation.

The treatment fluid, according to one or more embodiments herein, may include an epoxy resin, an amine-functionalized solid support, a second curing agent, and a carrier fluid. The amine-functionalized solid support may have been previously reacted with carbon dioxide to form a carbamate-rich amine-functionalized solid support. In addition, in one or more embodiments, the treatment fluid may optionally include an accelerator, a surfactant, a pH adjusting agent, or combinations thereof. The addition of solid support may improve the thermal stability and mechanical properties of the cured epoxy over pure cured epoxy resin. According to some embodiments, this formulation may be beneficial in naturally fractured reservoirs or hydraulically fractured wells to block highly permeable flow channels.

The amine-functionalized solid support may be prepared by either physically impregnating amine-rich compounds or chemically bonding amine functional groups to the surface of the solid support materials. Some examples of materials that may be used as solid support materials may include, but are not limited to porous adsorbent materials, such as silica materials, carbon materials, zeolites, and metal-organic frameworks (MOFs).

In some embodiments, the amine-rich compounds that may be physically impregnated into the solid support may include primary and secondary amines, amine-rich polymers, and combinations thereof. Some examples of primary and secondary amines include monoethanolamine (MEA), diethylenetriamine (DETA), triethylenetetramine (TETA), tetraethylenepentamine (TEPA), pentaethylenehexamine (PEHA), 2-amino-2-methyl-1-propanol (AMP), and diethanolamine. Examples of amine-rich polymers include polyethyleneimine, polyallylamine, polyvinylamine, polydiallylamine, and combinations thereof.

In one or more embodiments, physically impregnating amine-rich compounds to the surface of the solid support material may include contacting a solid support material with an amine-rich compound. The amine-rich compound may be in any form that would allow for physical contact between the surface of the solid support material and the amine-rich compound. For example, the amine-rich compound may be present as a liquid or may be dissolved in a solvent or a mixture of solvents capable of dissolving the amine-rich compound in one or more solvents such as water or organic solvents. Suitable organic solvents may include, but are not limited to, alcohols, acetone, hydrocarbons, and mixtures of organic solvents. A mixture of one or more organic solvents and water may also be used as a solvent. In one or more embodiments, the amine-rich compound may be contacted with the solid support in the solvent. After contacting the amine-rich compound and the solid support, remaining liquid such as solvent or amine-rich compound may be subsequently removed, leaving behind the amine-functionalized solid support.

In one or more embodiments, the amine-rich compounds that may be chemically bonded to the solid support may include, but are not limited to, various aminosilane compounds, including (3-aminopropyl)triethoxysilane, (3-aminopropyl)trimethoxysilane, (3-trimethoxysilylpropyl)diethylenetriamine, N-(3-(trimethoxysilyl)propyl)ethane-1,2-amine, 3-[2-(2-aminoethylamino)ethylamino]propyltrimethoxysilane, and combinations thereof.

Chemically bonding the amine-rich compounds to the solid support may include covalently bonding the amine-rich compounds to the surface of the solid support material. In one or more embodiments, covalently bonding the amine-rich compound to the surface of the solid support material may comprise reacting an aminosilane compound with silanol groups on the surface of the solid support material. The amine-rich compound may be dissolved in a solvent in some embodiments. A solution or liquid comprising the amine-rich compound may be contacted with the solid support material. The excess solvent or liquid may then be removed, leaving behind amine-functionalized solid support. Suitable solvents for covalently bonding the amine-rich compound to the surface of the solid support material may comprise any organic solvents capable of dissolving the amine-rich compound including, for example, anhydrous toluene, other hydrocarbons, and alcohols.

The amine-functionalized solid support may absorb carbon dioxide upon from a carbon dioxide source. Carbamate groups are formed via Reaction 1, producing carbamate-functionalized solid support.

$$2R-NH_2 + CO_2 \rightleftharpoons R-NHCOO^- + R-NH_3^+ \qquad (1)$$

The carbamate protects the amine groups from reacting with the epoxy, causing the carbamate-functionalized solid support serving as a delayed amine-containing crosslinker. Thermal decomposition upon reaching an elevated temperature, such as that of the formation, may cause the amine groups to regenerate upon introduction into the formation.

Cured epoxy resins may be suitable for water shutoff applications. Cured epoxy resins may cause blockage of high permeability channels in the formation, allowing for the reduction of water production by preventing the unwanted movement of water through high permeability channels. Blockage of high permeability channels may allow for improved water conformance control by forcing the water to travel through lower permeability channels, such as the lower permeability channels present in surrounding rock, thereby allowing the water to displace oil or gas.

The epoxy resin may be cured to form a crosslinked polymer network in the presence of one or more suitable curing agents. The epoxy resin may include, but is not limited to, bis-phenol A epoxy, bis-phenol F epoxy, aliphatic epoxy, cycloaliphatic epoxy, and combinations thereof.

A second curing agent may be added to further cure the epoxy resin under downhole conditions. The second curing agent may be a latent curing agent, meaning that the second curing agent can be stably stored together with epoxy resin at room temperature, and cure rapidly once activated by heat, pressure, and other factors. The second curing agent may be selected such that the second curing agent activates upon reaching downhole conditions, and may include, but is not limited to dicyandiamide and dihydrazide, such as adipic dihydrazide, isophthalic dihydrazide, sebacic acid dihydrazide and valine dihydrazide.

The carrier fluid comprises a solvent that may include water or an organic solvent. If the solvent is water, the carrier fluid may include fresh water, seawater, brine, and combinations thereof. If the solvent is an organic solvent, the solvent may include glycol ether, ethylene glycol, dimethyl sulfoxide, dimethyl formamide, and petroleum distillate fractions such as mineral oil, kerosene, naphtha, and diesel.

The accelerator may serve to accelerate the curing reaction between the epoxy resin and the second curing agent under downhole conditions. The accelerator may include, but is not limited to, tertiary amine, such as N,N-dimethylpiperidine, triethylenediamine and 2,4,6-tris (dimethylaminomethyl) phenol, imidazole, such as 2-methylimidazole and 2-ethyl-4-methylimidazole, and aromatic amine. In one or more embodiments, the concentration of accelerator in the treatment fluid may be in a range with a maximum value of any of 10 wt %, 6 wt %, or 3 wt %, and a minimum value of any of 0.1 wt %, 0.5 wt %, or 1 wt %, with any maximum value being combinable with any mathematically compatible minimum value.

The treatment fluid may further include one or more surfactants, pH adjusting agents, or both in the case of an aqueous-based solution. The one or more surfactants may be anionic, cationic, non-ionic, amphoteric, or a combination of these. The one or more surfactants may include, but are not limited to silicone, fatty acid ethoxylate, alkyl phenol ethoxylate, sorbitan ester ethoxylate, ethylene oxide-propylene oxide block copolymer, alcohol sulfate, alcohol ethoxy sulfate, alkylbenzene sulfonate, and betaine surfactants. In one or more embodiments, the concentration of surfactant in the treatment fluid may be in a range with a maximum value of any of 15 wt %, 12 wt %, or 10 wt %, and a minimum value of any of 1 wt %, 2 wt %, or 5 wt % of total formulation, with any maximum value being combinable with any mathematically compatible minimum value.

The pH adjusting agents may include, but are not limited to, sodium hydroxide, potassium hydroxide, sodium carbonate, organic acids, inorganic acids, or combinations thereof. In one or more embodiments, the concentration of pH adjusting agent in the treatment fluid may be in a range with a maximum value of any of 0.4 wt %, 0.2 wt %, or 0.1 wt % and a minimum value of any of 0.001 wt %, 0.005 wt %, or 0.01 wt % of total formulation by weight, with any maximum value being combinable with any mathematically compatible minimum value.

In some embodiments, maintaining the pH of the treatment fluid in a particular range may facilitate the epoxy curing reaction under the curing conditions, improve the stability of the components in the treatment fluid, modify the rheology of the treatment fluid, or combinations thereof. In one or more embodiments, the treatment fluid may have a basic or neutral pH, depending on the formulation.

The amine-functionalized solid support concentration in the treatment fluid may be in the range from about 0.1 wt % to about 10 wt %, where the wt % refers to the sorbent without absorbed $CO_2$. In one or more embodiments, the concentration of amine-functionalized solid support in the treatment fluid may be in a range with a minimum of about 0.1 wt %, 0.3 wt %, 0.5 wt %, or 1 wt % and a maximum of about 10 wt %, 8 wt %, 6 wt %, or 5 wt %, with any maximum being combinable with any mathematically compatible minimum.

The concentration of epoxy resin in the treatment fluid may be in the range from about 5 wt % to about 50 wt %. In one or more embodiments, the concentration of epoxy resin in the treatment fluid may be in a range with a minimum of about 5 wt %, 8 wt %, 10 wt %, or about 15 wt %, and a maximum of about 50 wt %, 40 wt %, or 30 wt %, with any maximum being combinable with any mathematically compatible minimum.

The concentration of the second curing agent in the treatment fluid may be in the range from about 0.5 wt % to about 30 wt %. In one or more embodiments, the concentration of the second curing agent in the treatment fluid may be in a range with a minimum of about 0.5 wt %, 1 wt %, 2 wt %, 5 wt %, or 8 wt %, and a maximum of about 30 wt %, 25 wt %, 20 wt % or 15 wt %, with any maximum being combinable with any mathematically compatible minimum.

The concentration of carrier fluid in the treatment fluid may be in the range from about 10 wt % to about 90 wt %. In one or more embodiments, the concentration of carrier fluid in the treatment fluid may be in a range with a minimum of about 10 wt %, 15 wt %, 20 wt %, or about 30 wt %, and a maximum of about 90 wt %, 80 wt %, or 70 wt %, with any maximum being combinable with any mathematically compatible minimum.

According to one or more embodiments, the treatment fluid may be introduced into a geological formation, such as an oil or gas well. Introduction into the geological formation may be accomplished by sending the treatment fluid through the wellbore or a coiled tubing string inside the wellbore, allowing the treatment fluid to reach the desired treatment location. The treatment location may be at a depth that is in a range from 500 ft to 15,000 ft, according to one or more embodiments. The treatment location may be located at a depth that is in a range with a minimum value of any of 500 ft, 800 ft, or 1000 ft, and a maximum value of 15,000 ft, 12,000 ft, or 10,000 ft, with any minimum being combinable with any mathematically compatible maximum. Downhole pressure may be in a range of between 0 psig and 5000 psig. Downhole temperature may be between 50° F. and 500° F.

The downhole conditions at the treatment location may cause the amine groups to regenerate from the carbamate groups in the carbamate-functionalized solid support as illustrated by Reaction (1) through thermal decomposition. The carbon dioxide is subsequently released into the formation and trapped in the geological the formation via various trapping mechanisms, including structural/stratigraphic trapping, residual trapping, solubility trapping, and mineral trapping. For instance, carbon dioxide can be transformed to mineral carbonates by reacting with alkaline minerals present in the geological formation, which is referred to as in-situ carbon dioxide mineralization.

The regenerated amine groups on the amine-functionalized solid support may serve as a delayed curing agent for the epoxy resin, leading to the formation of a crosslinked polymer network after the epoxy has cured. The well may be shut in to allow the epoxy resin to cure. In one or more embodiments, the well may be shut in for a duration in a range from about 24 hours to about 168 hours. In some embodiments, the duration that the well is shut in may be in a range with a minimum of any of about 24 hours, 30 hours, 36 hours, or 48 hours, and a maximum of any of about 168 hours, 144 hours, 120 hours, or 96 hours with any minimum being combinable with any maximum.

The crosslinked polymer may plug the high permeability channels and reduce the amount of water flowing through the channels, decreasing the amount of water production. The carbon dioxide that has been released due to the thermal activation may then be trapped in the formation via various trapping mechanisms such as structural/stratigraphic trapping, residual trapping, solubility trapping, and mineral trapping. For example, carbon dioxide may undergo in-situ carbon dioxide mineralization, where carbon dioxide reacts with various alkaline minerals present in the geological formation and is transformed into mineral carbonates.

EXAMPLE

An amine rich compound was impregnated into a porous solid material by adding 5 g of zeolite into a beaker containing 50 mL of diethylenetriamine (DETA). The slurry was mixed for 24 hours at 75° F. to allow the DETA to be fully adsorbed by the zeolite, forming an amine-functionalized solid support.

The excess liquid was decanted from the beaker. The solids were moved into a 1-inch diameter by 6-inch-long cylinder fitted with an injection port at the bottom to allow injection of $CO_2$ from the bottom of the cylinder. A distribution plate composed of a fine 0.5-micron filter disk was located the bottom of the cylinder. The amine-functionalized solid support material was placed on top of the disk. Carbon dioxide was continuously injected for through the filter for 4 hours at ambient conditions, entering the chamber above to allow the amine-functionalized zeolite to adsorb the $CO_2$ onto the amine functional group.

The $CO_2$-saturated material was moved to a pressure vessel containing 20 g of bis-phenol A epoxy resins and 170 g of diesel. After being well mixed, the mixture was placed in a water bath set at 190° F. and 500 psi for 96 hours to allow the epoxy to cure. Once cured and cooled, the solid mass was retrieved from the pressure vessel. The resulted bulk density was 1.9 g/cm$^3$, and the unconfined compressive strength was 350 psi.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A treatment fluid for water shut-off applications, the treatment fluid comprising:
    an amine-functionalized solid support comprising a porous adsorbent material functionalized with an amine-rich compound selected from the group consisting of monoethanolamine (MEA), diethylenetriamine (DETA), triethylenetetramine (TETA), tetraethylenepentamine (TEPA), pentaethylenehexamine (PEHA), 2-amino-2-methyl-1-propanol (AMP), diethanolamine, polyethyleneimine, polyallylamine, polyvinylamine, and polydiallylamine;
    an epoxy resin selected from the group consisting of bis-phenol A epoxy, bis-phenol F epoxy, aliphatic epoxy, and cycloaliphatic epoxy;
    a second curing agent selected from the group consisting of a dicyandiamide and a dihydrazide; and
    a carrier fluid selected from the group consisting of water, glycol ether, ethylene glycol, dimethyl sulfoxide, dimethyl formamide, and petroleum distillate fractions,
    where the amine-functionalized solid support has been previously reacted with carbon dioxide to produce a carbamate-functionalized solid support.

2. The treatment fluid of claim 1, further comprising one or more surfactants selected from the group consisting of silicone, fatty acid ethoxylate, alkyl phenol ethoxylate, sorbitan ester ethoxylate, ethylene oxide-propylene oxide block copolymer, alcohol sulfate, alcohol ethoxy sulfate, alkylbenzene sulfonate, and betaine surfactants.

3. The treatment fluid of claim 1, further comprising an accelerator selected from the group consisting of a tertiary amine, an imidazole, and an aromatic amine.

4. The treatment fluid of claim 1, further comprising a pH adjusting agent selected from the group consisting of sodium hydroxide, potassium hydroxide, and sodium carbonate.

5. The treatment fluid of claim 1, where the porous adsorbent material is selected from the group consisting of silica materials, carbon materials, zeolites, and metal-organic frameworks (MOFs).

6. The treatment fluid of claim 1, where the amine-rich compound is physically impregnated into the porous adsorbent material.

7. The treatment fluid of claim 1, where the second curing agent concentration in the treatment fluid is in the range from about 0.5 wt % to about 30 wt %.

8. The treatment fluid of claim 1, where the carrier fluid concentration in the treatment fluid is in the range from about 10 wt % to about 90 wt %.

9. The treatment fluid of claim 1, where the amine-functionalized solid support concentration in the treatment fluid is in the range from about 0.1 wt % to about 10 wt %.

10. The treatment fluid of claim 1, where the epoxy resin concentration in the treatment fluid is in the range from about 5 wt % to about 50 wt %.

* * * * *